United States Patent
Nagao

(10) Patent No.: US 9,942,832 B2
(45) Date of Patent: Apr. 10, 2018

(54) WIRELESS LAN SYSTEM AND WIRELESS COMMUNICATION DEVICE

(71) Applicant: JVC KENWOOD Corporation, Yokohama-shi, Kanagawa (JP)

(72) Inventor: Shuji Nagao, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 7 days.

(21) Appl. No.: 14/836,051

(22) Filed: Aug. 26, 2015

(65) Prior Publication Data

US 2016/0044587 A1    Feb. 11, 2016

Related U.S. Application Data

(63) Continuation of application No. PCT/JP2014/056614, filed on Mar. 13, 2014.

(30) Foreign Application Priority Data

| Mar. 29, 2013 | (JP) | 2013-071059 |
| Mar. 29, 2013 | (JP) | 2013-071068 |
| Jan. 27, 2014 | (JP) | 2014-012022 |
| Jan. 27, 2014 | (JP) | 2014-012024 |

(51) Int. Cl.
*H04W 48/16* (2009.01)
*H04W 48/14* (2009.01)
*H04W 84/12* (2009.01)

(52) U.S. Cl.
CPC .......... *H04W 48/16* (2013.01); *H04W 48/14* (2013.01); *H04W 84/12* (2013.01)

(58) Field of Classification Search
None
See application file for complete search history.

(56) References Cited

U.S. PATENT DOCUMENTS

2012/0094666 A1*  4/2012  Awoniyi .............. H04W 48/16
                                                                                        455/435.1

FOREIGN PATENT DOCUMENTS

| JP | 2006-93945 A | 4/2006 |
| JP | 2008506335 A | 2/2008 |
| JP | 2009-141981 A | 6/2009 |
| JP | 2012147324 A | 8/2012 |
| WO | 2009/130998 A1 | 10/2009 |
| WO | 2012/111261 A1 | 8/2012 |

OTHER PUBLICATIONS

Official Action dated May 22, 2017 in the counterpart Japanese Application 2014-012024.
International Search Report dated May 27, 2014 issued in International Application No. PCT/JP2014/056614.

* cited by examiner

*Primary Examiner* — Adnan Baig
(74) *Attorney, Agent, or Firm* — Nath, Goldberg & Meyer; Jerald L. Meyer

(57) ABSTRACT

A wireless terminal transmits a probe request message to a non-connected base station by changing the communication frequency from a first frequency to a second frequency used by the non-connected base station. The non-connected base station wirelessly sends a probe response message to the wireless terminal using the second frequency. The non-connected base station sends a probe redundant message to a connected base station by wire through a wired LAN. The connected base station wirelessly sends a probe redundant response message to the wireless terminal using the first frequency.

4 Claims, 14 Drawing Sheets

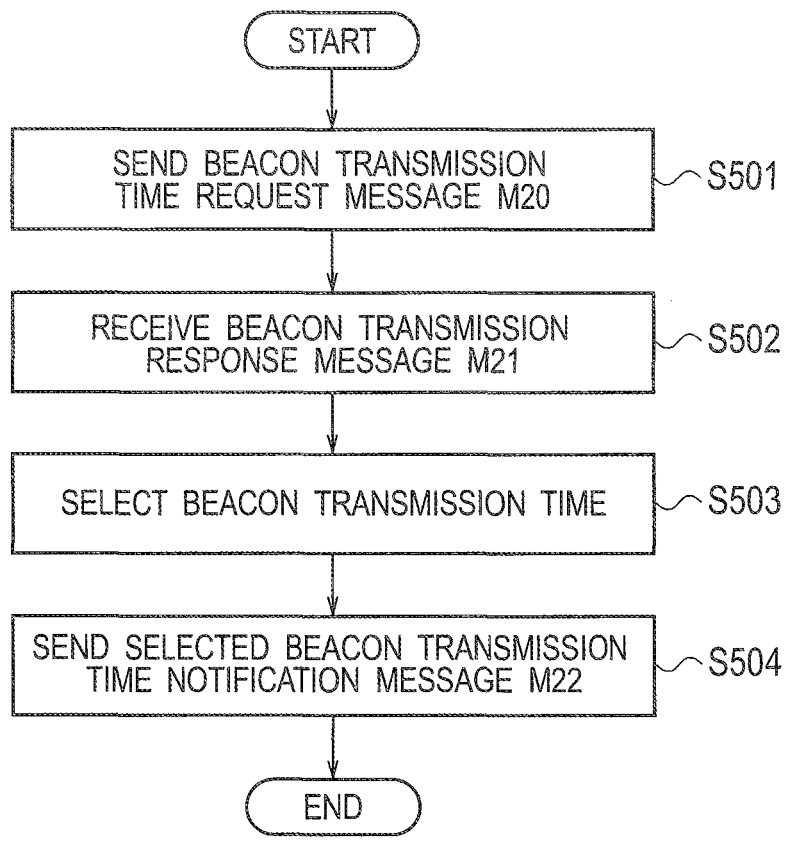
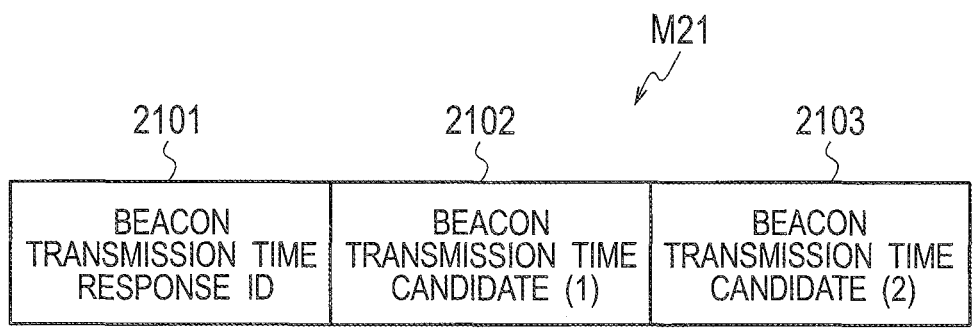

WIRELESS LAN SYSTEM AND WIRELESS COMMUNICATION DEVICE

CROSS REFERENCE TO RELATED APPLICATION

This application is a Continuation of PCT Application No. PCT/JP2014/056614, filed on Mar. 13, 2014, and claims the priority of Japanese Patent Application No. 2013-071059, filed on Mar. 29, 2013, No. 2013-071068, filed on Mar. 29, 2013, No. 2014-012022, filed on Jan. 27, 2014, and No. 2014-012024, filed on Jan. 27, 2014, the entire contents of all of which are incorporated herein by reference.

BACKGROUND

The present disclosure relates to a wireless LAN system including a wireless terminal and a base station wirelessly communicating with each other, and a wireless communication device communicating with a base station.

A wireless LAN system standardized by IEEE802.11 performs roaming to change the base station currently connected to a wireless communication device (wireless terminal) to an alternative base station. When the level of radio waves received from the connected base station lessens and the quality of communication between the wireless terminal and base station cannot be ensured, for example, the wireless communication device roams to another base station that can provide better quality communication with the wireless communication device.

In the process of roaming, the wireless terminal searches for base stations which can be candidates for the alternative base station and previously acquires information on the candidates before roaming from the connected base station to another base station. This can shorten the time taken to roam from the connected base station to the alternative base station.

The methods by which the wireless terminal searches for base stations include active scanning and passive scanning. With an active scan, the wireless terminal transmits a probe request message. With a passive scan, the wireless terminal waits for beacons transmitted from base stations.

In the active scan, after receiving a probe response message from a base station within a time called MinChannelTime, the wireless terminal must continue searching during the time called MaxChannelTime. If the wireless terminal cannot find any other base station, the time corresponding to the difference between MaxChannelTime and MinChannelTime is exhausted.

In the passive scan, the wireless terminal must continue searching during MaxChannelTime. Accordingly, if the wireless terminal cannot find any other base station, the time corresponding to MaxChannelTime is exhausted.

SUMMARY

The wireless terminal searches for base stations using a frequency different from the frequency used in transmission and reception to and from the connected base station. Accordingly, data communication is delayed during the search for base stations. It is therefore necessary to minimize the time taken searching for base stations. Especially when the wireless LAN system provides voice calls, that require high real-time performance, the search time needs to be minimized because long search times affect the call quality.

A first aspect of the embodiments provides a wireless LAN system including: a wireless terminal; and a plurality of base stations connected to each other through a wired LAN, wherein the plurality of base stations include a connected base station which is wirelessly connected to the wireless terminal using a first frequency and a non-connected base station which is not wirelessly connected to the wireless terminal, the wireless terminal includes a probe request message transmission section which changes communication frequency from the first frequency to a second frequency used by the non-connected base station and thereby sends a probe request message to the non-connected base station, the non-connected base station includes: a first probe response message transmission section configured to wirelessly send a first probe response message to the wireless terminal using the second frequency in response to reception of the probe request message; and a second probe response message transmission section configured to send a second probe response message to the connected base station through the wired LAN in response to reception of the probe request message, and the connected base station includes a third probe response message transmission section configured to send the second probe response message to the wireless terminal using the first frequency, and the wireless terminal further includes a probe response message reception section configured to change the communication frequency from the second frequency to the first frequency after the probe request message is sent and thereby receive the second probe response message sent by the third probe response message transmission section.

A second aspect of the embodiments provides a wireless communication device including: a probe request message transmission section configured to, when the wireless communication device is wirelessly connected to a connected base station using a first frequency, change communication frequency to a second frequency used by a non-connected base station that is not wirelessly connected to the wireless communication device and is connected to the connected base station through a wired LAN and thereby send a probe request message to the non-connected base station; and a probe response message reception section configured to wirelessly receive from the connected base station using the first frequency, a second probe response message sent by the non-connected base station, which wirelessly sends a first probe response message using the second frequency in response to reception of the probe request message, to the connected base station through the wired LAN in response to reception of the probe request message, wherein the second probe response message includes a received signal level of the probe request message received by the non-connected base station, the wireless communication device further comprising a signal level determination section configured to, based on the received signal level included in the second probe response message, determine the signal level at which the wireless communication device and the non-connected base station wirelessly communicate with each other.

A third aspect of the embodiments provides a wireless communication device, including: a probe request message transmission section configured to, when the wireless communication device is wirelessly connected to a connected base station using a first frequency, change communication frequency to a second frequency used by a non-connected base station that is not wirelessly connected to the wireless terminal and is connected to the connected base station through a wired LAN and thereby send a probe request message to a non-connected base station; and a probe response message reception section configured to receive anyone of a first probe response message or a second probe response message, the first probe response message being wirelessly sent by the non-connected base station using the second frequency in response to reception of the probe request message, the second probe response message being sent by the non-connected base station to the connected base station through the wired LAN in response to reception of the probe request message and then wirelessly sent by the connected base station using the first frequency, wherein the probe response message reception section overwrites the second probe response message with the first probe response message when receiving the first probe response message after receiving the second probe response message.

BRIEF DESCRIPTION OF THE DRAWINGS

FIG. 19 is a flowchart illustrating a process in which the wireless terminal selects the transmission time of a beacon sent by another base station.

FIG. 20 is a diagram illustrating a configuration example of a beacon transmission response message that another base station having received the beacon transmission time request message sends to the wireless terminal.

DETAILED DESCRIPTION

Hereinafter, a description is given of a wireless LAN system and a wireless communication device of the embodiments with reference to the accompanying drawings. In the wireless communication device of the embodiments, the method of searching for base stations is set to any one of active scanning and passive scanning.

The wireless communication device of the embodiments is configured to selectively perform one of active scanning and passive scanning. However, the wireless communication device may be configured to perform active scanning only or passive scanning only.

Figure 1:
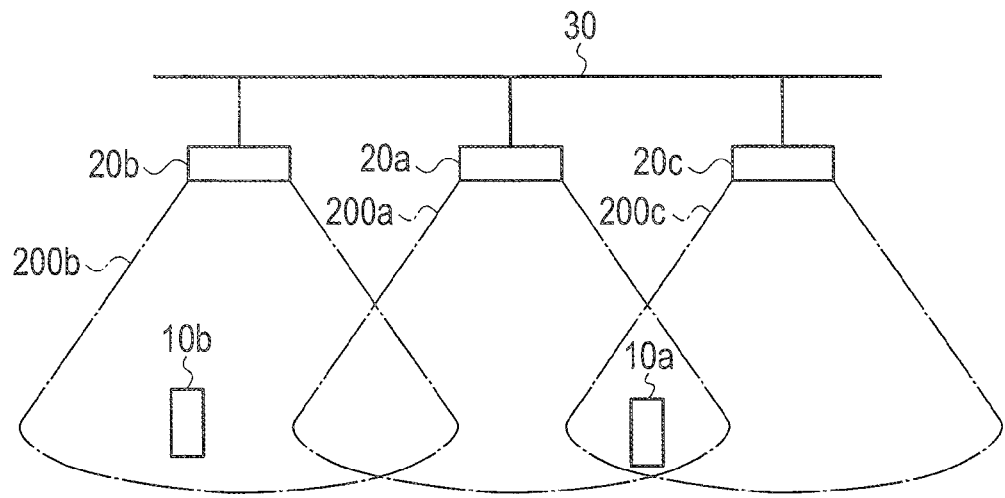
FIG. 1 is a view illustrating a schematic overall configuration of a wireless LAN system of at least one embodiment.

First, a description is given of the schematic overall configuration of the wireless LAN system of the embodiments using FIG. 1. In FIG. 1, the wireless LAN system includes wireless terminals 10a and 10b and base stations 20a, 20b, and 20c. The base stations 20a to 20c are connected to one another through a wired LAN 30. There could be one or more wireless terminals, however the number of base stations needs to be plural. The wireless terminals 10a and 10b are wireless communication devices of the embodiments.

The wireless terminals 10a and 10b are collectively referred to as wireless terminals 10. Any wireless terminal that is not specified as the wireless terminal 10a or 10b is referred to as a wireless terminal 10 in some cases. The base stations 20a to 20c are collectively referred to as base stations 20. Any base station that is not specified as any one of the base stations 20a to 20c is referred to as abase station 20 in some cases.

It is assumed that the radio waves emitted from the base stations 20a to 20c are available in service areas 200a, 200b, and 200c indicated by dot-and-dashed lines, respectively. In the example illustrated in FIG. 1, the wireless terminal 10a is located within both of the service areas 200a and 200c, and the wireless terminal 10b is located only in the service area 200b. In the following description, the wireless terminals 10a and 10b are connected to the base stations 20a and 20b, respectively.

Figure 2:
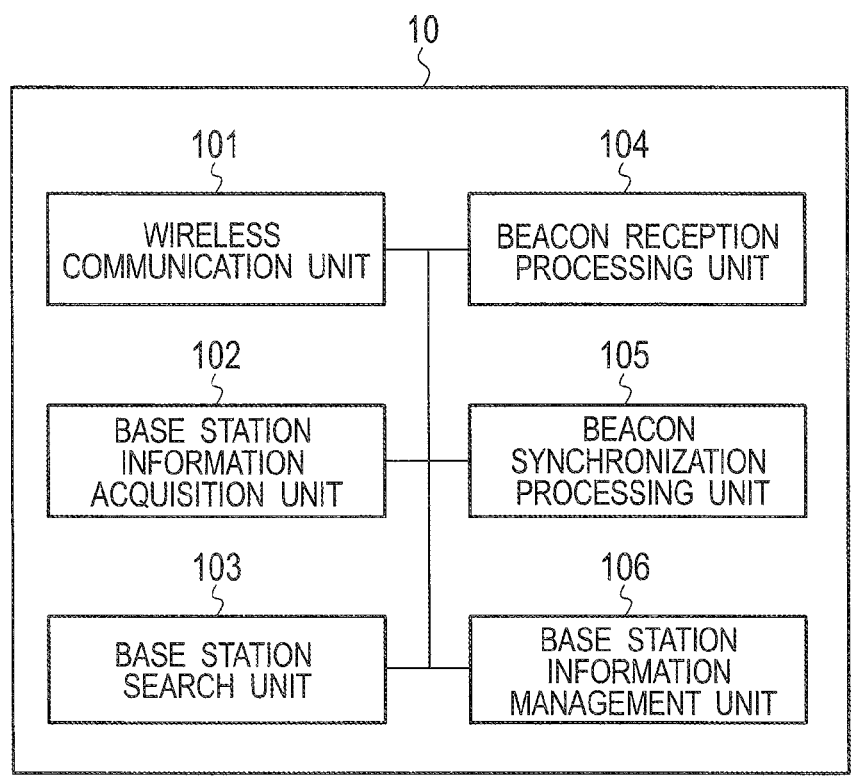
FIG. 2 is a block diagram illustrating a specific internal configuration of a wireless terminal constituting the wireless LAN system, which is a wireless communication device of at least one embodiment.

FIG. 2 illustrates the specific internal configuration of the wireless terminals 10. Each wireless terminal 10 includes a wireless communication unit 101, a base station information acquisition unit 102, a base station search unit 103, a beacon reception processing unit 104, a beacon synchronization processing unit 105, and a base station information management unit 106.

The wireless communication unit 101 performs a process to wirelessly transmit and receive data to and from the base stations 20. The base station information acquisition unit 102 requests and acquires information on other base stations 20 which are connected to the connected base station 20 through the wired LAN 30. In this process, the base station information acquisition unit 102 generates an alternative base station information request message which is to be transmitted to the connected base station 20. The base station search unit 103 executes a process to search base stations 20 other than the connected base station 20.

The beacon reception processing unit 104 executes a process to receive beacons transmitted by base stations 20. The beacons are information necessary for the wireless terminal 10 to start connection with base stations 20.

The beacon synchronization processing unit 105 determines the timing to search base stations 20 based on the timing at which the base station 20 using the same frequency as the frequency for search sends beacons. The base station information management unit 106 manages the information on base stations 20 acquired by the base station search unit 103.

Figure 3:
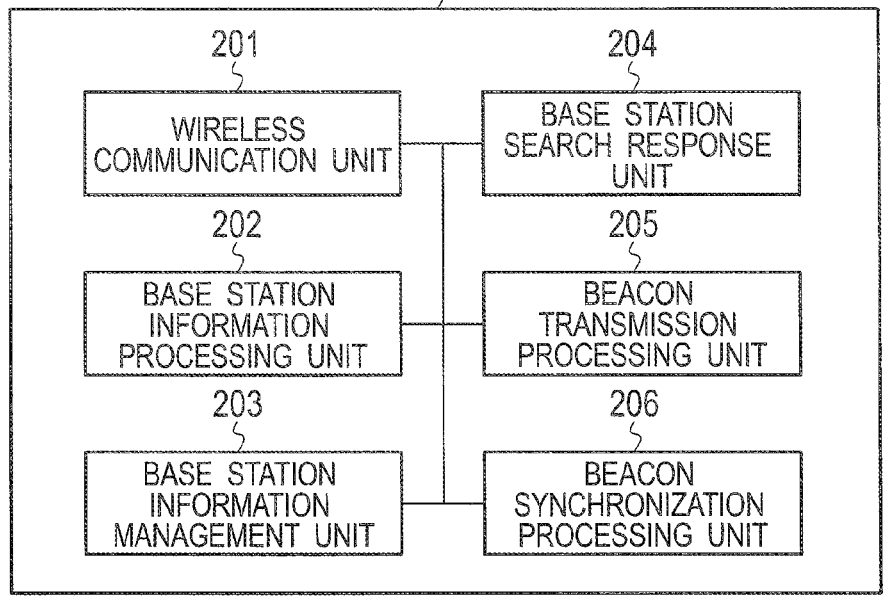
FIG. 3 is a block diagram illustrating a specific internal configuration of a base station constituting the wireless LAN system, which is a wireless communication device of at least one embodiment.

FIG. 3 illustrates the specific internal configuration of the base stations 20. Each base station 20 includes a wireless communication unit 201, a base station information processing unit 202, a base station information management unit 203, a base station search response unit 204, a beacon transmission processing unit 205, and a beacon synchronization processing unit 206.

The wireless communication unit 201 performs a process to wirelessly transmit and receive data from and to the wireless terminal 10. The base station information processing unit 202 receives the alternative base station information request message sent by a wireless terminal 10 and sends the alternative base station information request message to other base stations 20 through the wired LAN 30. The base station information processing unit 202 receives information on the other base stations 20 which is transmitted from the other base stations 20 in response to the alternative base station information request message.

The base station information management unit 203 stores and manages the information on other base stations 20 received by the base station information processing unit 202. The base station information management unit 203 includes abase station database (base station DB).

The base station search response unit 204 processes the probe request message sent by the wireless terminal 10. The beacon transmission processing unit 205 executes a process to send beacons. The beacon synchronization processing unit 206 manages the timing to send beacons.

Figure 4:
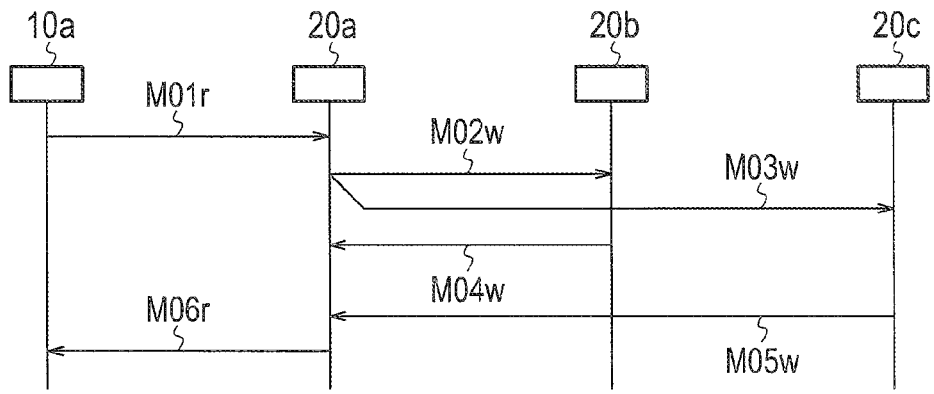
FIG. 4 is a sequence diagram illustrating a message flow to acquire information on base stations before the wireless terminal searches for base stations.

The wireless terminal 10 previously acquires information on the base stations 20 connected to the wired LAN 30 via the base station 20a currently connected to the wireless terminal 10 in order to search for base stations 20. FIG. 4 illustrates a message flow by which the wireless terminal 10a connected to the base station 20a acquires the base station information on the base stations 20b and 20c.

In FIG. 4, the wireless terminal 10a sends an alternative base station information request message M01r generated by the base station information acquisition unit 102 to the base station 20a through the wireless communication unit 101. In the transmission/reception messages shown in FIG. 4, the messages with subscripts "r" are messages wirelessly transmitted or received, and the messages with subscripts "w" are messages transmitted or received through the wired LAN 30.

Figure 5:
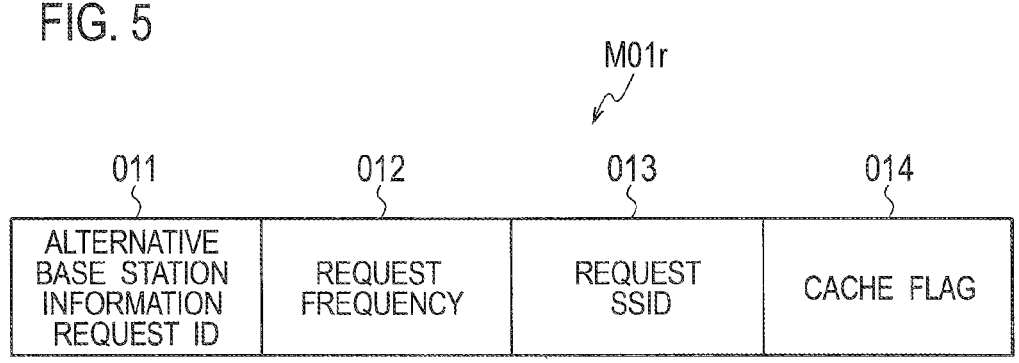
FIG. 5 is a diagram illustrating a configuration example of an alternative base station information request message that the wireless terminal sends to the connected base station.

The wireless communication unit 201 of the base station 20a receives the alternative base station information request message M01r, and the base station information processing unit 202 processes the alternative base station information request message M01r. FIG. 5 illustrates a configuration example of the alternative base station information request message M01r. As illustrated in FIG. 5, the alternative base station information request message M01r includes an alternative base station information request ID 011, a request frequency 012, a request SSID 013, and a cache flag 014.

The alternative base station information request message M01r may be transmitted in the IP packet format or may be transmitted as probe request data. When transmitted as the probe request data, the alternative base station information request message M01r is transmitted as an information element included in the probe request data. The other messages may be also transmitted in the IP packet format or as the information element.

The alternative base station information request ID 011 indicates that the message is an alternative base station information request message. The request frequency 012 indicates the communication frequency of a base station 20 of which the wireless terminal 10 intends to acquire information. The request frequency 012 may specify one frequency of a base station 20, or frequencies of a plurality of base stations 20.

The request SSID 013 indicates the SSID of the base station 20 of which the wireless terminal 10 intends to acquire information. The request SSID 013 may specify one SSID of a base station 20, or SSIDs of a plurality of base stations 20. The cache flag 014 is a flag to indicate whether to send the base station information held by the base station 20a as a response to the alternative base station information request message M01r.

Figure 6:
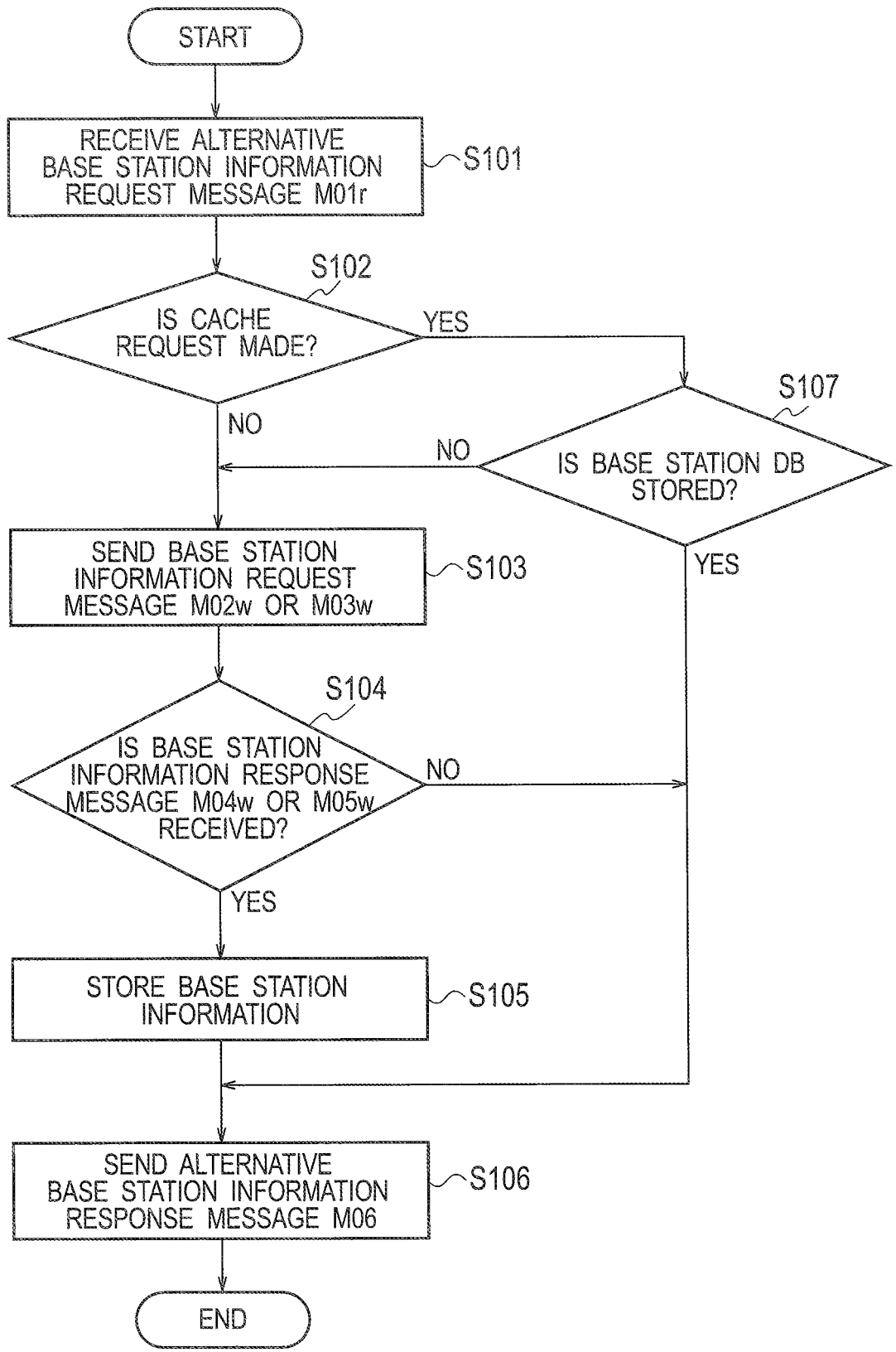
FIG. 6 is a flowchart illustrating a process executed by the base station having received the alternative base station information request message.

FIG. 6 shows a process executed by the base station information processing unit 202 when the base station 20a receives the alternative base station information request message M01r. The base station information processing unit 202 receives the alternative base station information request message M01r in step S101. In step 102, the base station information processing unit 202 examines the cache flag 014 to determine whether a cache request is made. The cache request refers to a request of the wireless terminal 10a for the base station information already stored by the base station 20a as the response.

When a cache request is not made (NO), as illustrated in FIG. 4, the base station information processing unit 202 transmits base station information request messages M02w and M03w to the base stations 20b and 20c, respectively, in step S103.

Figure 7A:
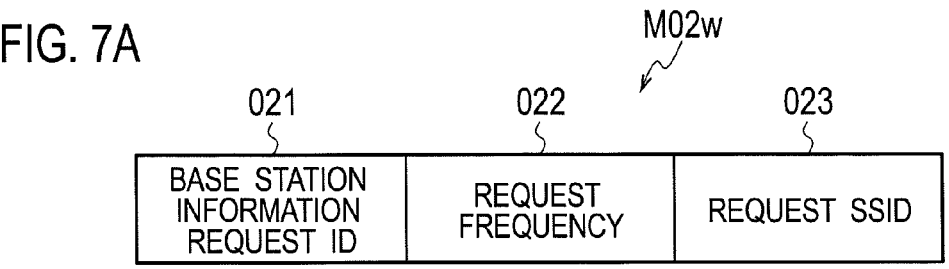
FIG. 7A is a diagram illustrating a configuration example of a base station information request message M02w that the base station having received the alternative base station information request message sends to another base station.
Figure 7B:
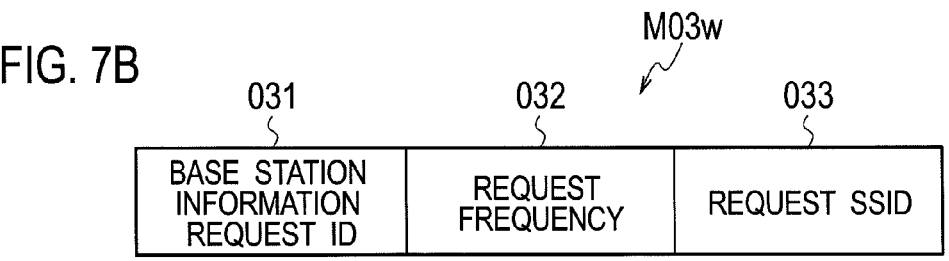
FIG. 7B is a diagram illustrating a configuration example of a base station information request message M03w that the base station having received the alternative base station information request message sends to still another base station.

FIGS. 7A and 7B are configuration examples of the base station information request messages M02w and M03w. As illustrated in FIG. 7A, the base station information request message M02w includes a base station information request ID 021, a request frequency 022, and a request SSID 023. As illustrated in FIG. 7B, the base station information request message M03w includes a base station information request ID 031, a request frequency 032, and a request SSID 033.

The base station information request IDs 021 and 031 indicate that the message is the base station information request message. The request frequencies 022 and 032 are the communication frequencies of the base station 20 of which the wireless terminal 10 intends to acquire information. The request frequency 022 and 032 may specify one frequency of a base station 20, or frequencies of a plurality of base stations 20, respectively.

The request SSIDs 023 and 033 indicate the SSIDs of the base station 20 of which the wireless terminal 10 intends to acquire information. The request SSID 023 or 033 may specify one SSID of a base station 20, or SSIDs of a plurality of base stations 20, respectively.

In FIG. 6, the base station information processing unit 202 determines in step S104 whether the base station information response message M04w or M05w is received as illustrated in FIG. 4.

Figure 8A:
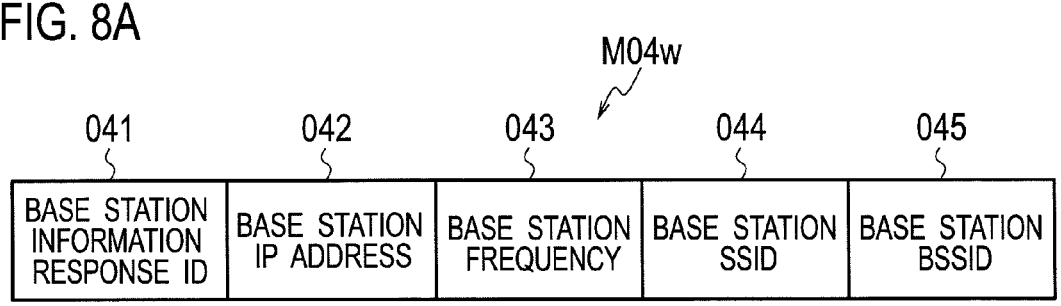
FIG. 8A is a diagram illustrating a configuration example of a base station information response message M04w that another base station having received the base station information request message M02w sends to the base station having sent the base station information request message M02w.
Figure 8B:
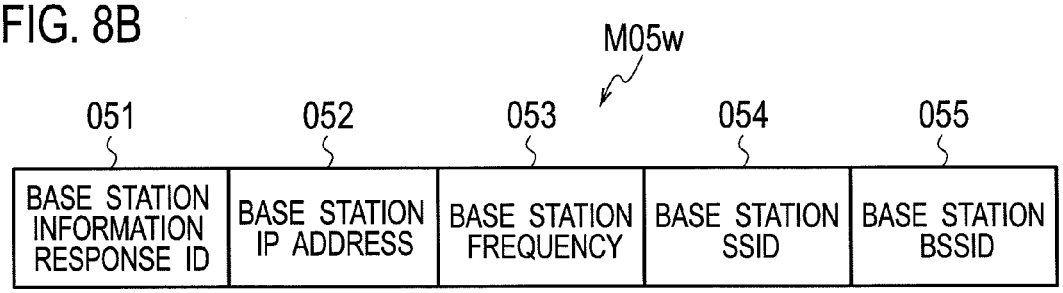
FIG. 8B is a diagram illustrating a configuration example of a base station information response message M05w that still another base station having received the base station information request message M03w sends to the base station having sent the base station information request message M03w.

FIGS. 8A and 8B are configuration examples of the base station information response messages M04w and M05w, respectively. As illustrated in FIG. 8A, the base station information response message M04w includes a base station information response ID 041, a base station IP address 042, a base station frequency 043, a base station SSID 044, and a base station BSSID 045. As illustrated in FIG. 8B, the base station information response message M05w includes a base station information response ID 051, a base station IP address 052, a base station frequency 053, a base station SSID 054, and a base station BSSID 055.

The base station information response IDs 041 and 051 indicate that the messages are the base station information response messages. The base station IP addresses 042 and 052 indicate the IP addresses of the base stations 20b and 20c, respectively. The base station frequencies 043 and 053 indicate the communication frequencies used by the base stations 20b and 20c, respectively.

The base station SSIDs 044 and 054 indicate the SSIDs of the base station 20. The SSIDs of the base stations 20a to 20c are the same. The base station BSSIDs 045 and 055 indicate the BSSIDs of the base station 20b and 20c, respectively. The BSSIDs of the base stations 20a to 20c are different from one another. The base station BSSIDs correspond to MAC addresses of base stations 20.

Figure 9A:
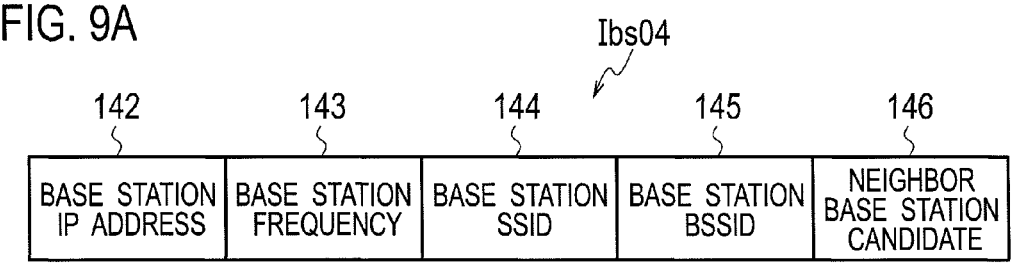
FIG. 9A is a diagram illustrating a configuration example of base station information Ibs04 generated by the base station having received the base station information response message M04w.
Figure 9B:
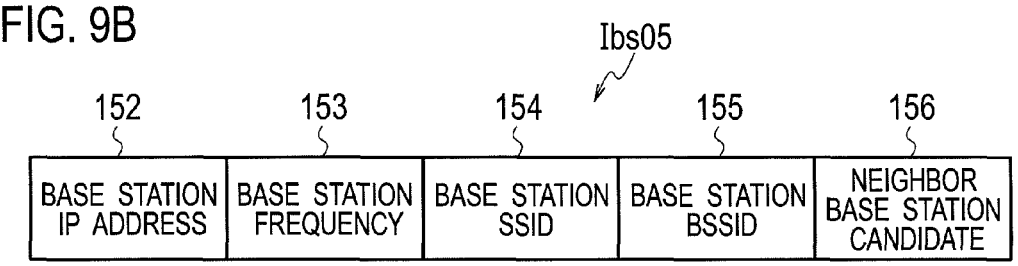
FIG. 9B is a diagram illustrating a configuration example of base station information Ibs05 generated by the base station having received the base station information response message M05w.

Returning to FIG. 6, when the base station information processing unit 202 receives the base station information response messages M04a and M05w in the step S104 (YES), the base station information processing unit 202 generates base station information Ibs04 and Ibs05 (illustrated in FIGS. 9A and 9B) based on the base station information response messages M04w and M05w in step S105. The base station information processing unit 202 transfers the generated base station information Ibs04 and Ibs05 to the base station information management unit 203 and causes the base station information management unit 203 to store the base station information Ibs04 and Ibs05. FIGS. 9A and 9B are the configuration examples of the base station information Ibs04 and Ibs05, respectively.

The base station information management unit 203 stores the base station information Ibs04 and Ibs05 in the base station DB. The base station DB is capable of storing one or a plurality of sets of base station information.

As shown in FIG. 9A, the base station information Ibs04 generated based on the base station information response message M04w includes a base station IP address 142, a base station frequency 143, a base station SSID 144, a base station BSSID 145, and a neighbor base station candidate 146. The contents of the base station IP address 142, base station frequency 143, base station SSID 144 or base station BSSID 145 are the same as those of the base station IP address 042, base station frequency 043, base station SSID 044 and base station BSSID 045, which are shown in FIG. 8A, respectively.

As shown in FIG. 9B, the base station information Ibs05 generated based on the base station information response message M05w includes a base station IP address 152, a base station frequency 153, a base station SSID 154, a base station BSSID 155, and a neighbor base station candidate 156. The contents of the base station IP address 152, base station frequency 153, base station SSID 154 or base station BSSID 155 are the same as those of the base station IP address 052, base station frequency 053, base station SSID 054 and base station BSSID 055, which are shown in FIG. 8B, respectively.

The neighbor base station candidates 146 and 156 are data representing base station candidates located near the base station 20a.

Returning to FIG. 6 again, in step S106, the base station information processing unit 202 sends a list of the acquired base station information Ibs04 and Ibs05 to the wireless terminal 10a as an alternative base station information response message M06r as shown in FIG. 4, and terminates the process.

On the other hand, when a cache request is made in the step S102 (YES), the base station information processing unit 202 determines in step S107 whether the base station DB is stored in the base station information management unit 203. When the base station DB is stored (YES), the base station information processing unit 202 moves the process to the step S106. When the base station DB is not stored (NO), the base station information processing unit 202 moves the process to the step S103.

When the base station information processing unit 202 does not receive the base station information response message M04w or M05w in the step S104 (NO), the base station information processing unit 202 moves the process to the step S106.

Figure 10:
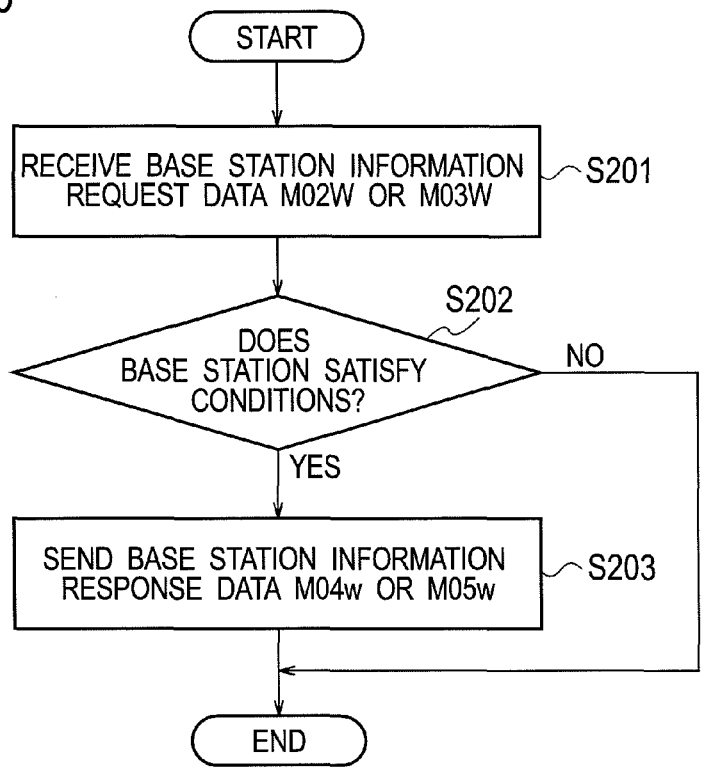
FIG. 10 is a flowchart illustrating a process executed by the base station having received a base station information request message.

FIG. 10 shows a process executed by the base station information processing unit 202 when the base station 20b or 20c receives the base station information request message M02w or M03w. In step S201 of FIG. 10, the base station information processing units 202 of the base station 20b or 20c receives the base station information request message M02w or M03w.

The base station information processing unit 202 determines whether the base station 20*h* or 20*c* match the conditions specified by the request frequency 022 or 032 and request SSID 023 or 033 included in the base station information request message M02*w* or M03*w*. When the base station 20*b* or 20*c* matches the conditions (YES), the base station information processing unit 202 transmits the base station information response message M04*w* or M05*w* to the base station 20*a* in the step S203 and terminates the process. When the base station 20*b* or 20*c* do not match the conditions (NO), the base station information processing unit 202 terminates the process.

Figure 11:
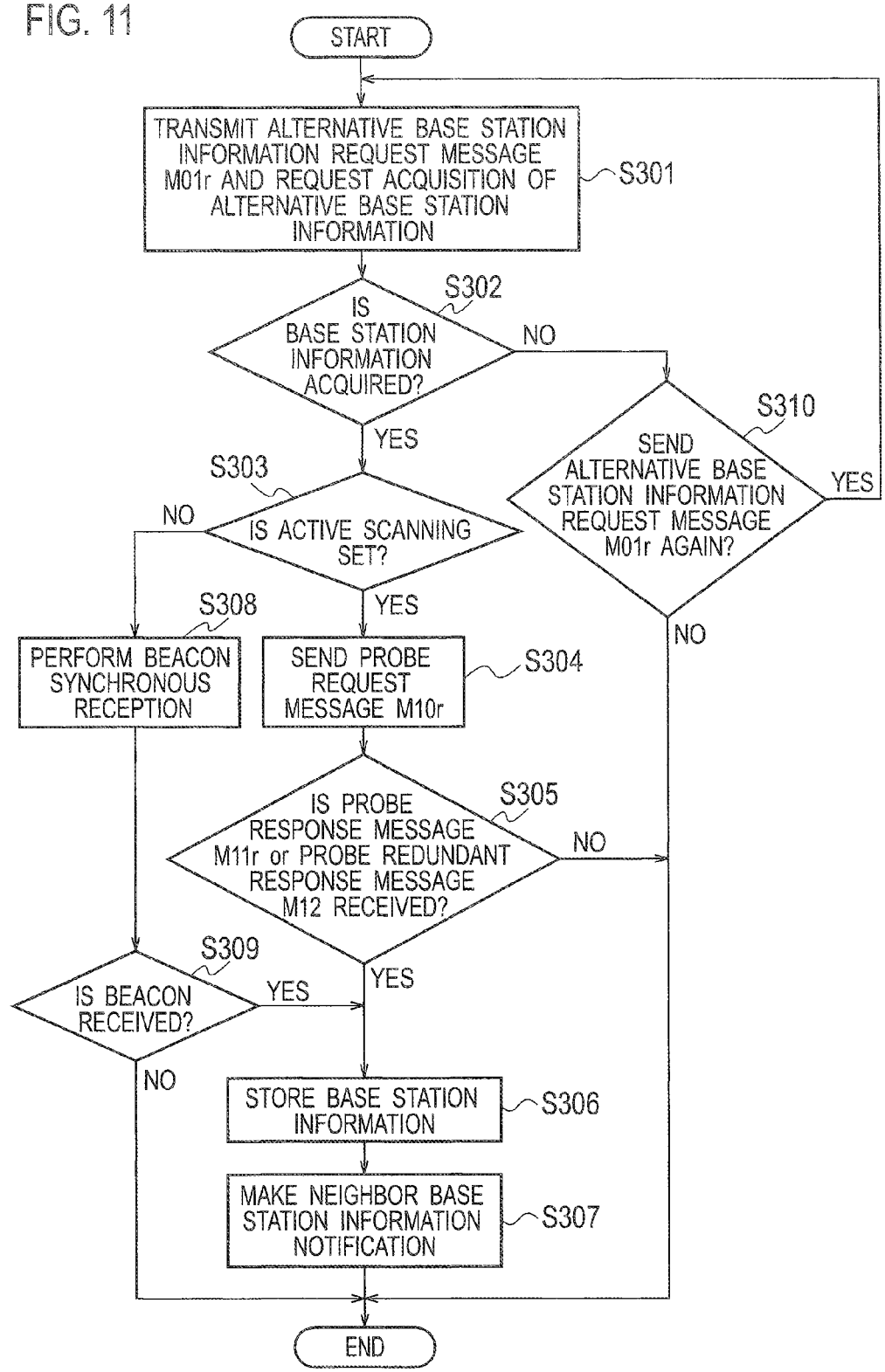
FIG. 11 is a flowchart illustrating an overall process executed by the wireless terminal to search for base stations.

FIG. 11 illustrates an operation of the wireless terminal 10*a* searching for base stations 20. The base station information acquisition unit 102 of the wireless terminal 10*a* sends the alternative base station information request message M01*r* to the base station 20*a* in step S301 to request alternative base station information. The base station information acquisition unit 102 receives the alternative base station information response message M06*r* and determines whether the base station information is acquired in step S302.

When the base station information acquisition unit 102 does not acquire the base station information (NO), in step S310, the base station information acquisition unit 102 determines whether to send the alternative base station information request message M01*r* again. When the base station information acquisition unit 102 is configured to send the base station information request message M01*r* multiple times, the base station information acquisition unit 102 determines in step S310 to send the alternative base station information request message M01*r* again (YES). In this case, the base station information acquisition unit 102 returns the process to the step S301.

When the base station information acquisition unit 102 is configured to send the base station information request message M01*r* only once, the base station information acquisition unit 102 determines in the step S310 not to transmit the base station information request message M01*r* again. In this case, the base station information acquisition unit 102 terminates the process. The number of times for which the base station information acquisition unit 102 sends the alternative base station information request message M01*r* may be set to a predetermined number.

When the base station information acquisition unit 102 receives the base station information in step S302 (YES), the base station search unit 103 determines in step S303 whether the base station search method is set to active scanning. The base station search method can be set to active or passive scanning by software. When the base station search method is set to active scanning (YES), the base station search unit 103 executes the process by steps S304 to 307.

The steps S304 and S305 show an operation to search for base stations 20 other than the base station 20*a* by active scanning when the wireless terminal 10*a* is connected to the base station 20*a*. The base station search unit 103 uses the acquired base station information to search for base stations 20 other than the base station 20*a* in the following manner.

Figure 12:
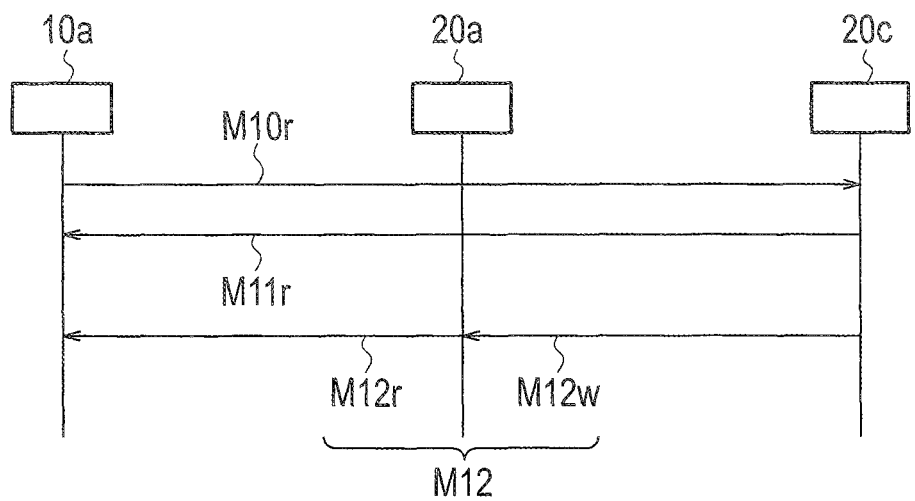
FIG. 12 is a sequence diagram illustrating a message flow to search for base stations when the base station search method is set to active scanning.
Figure 13:
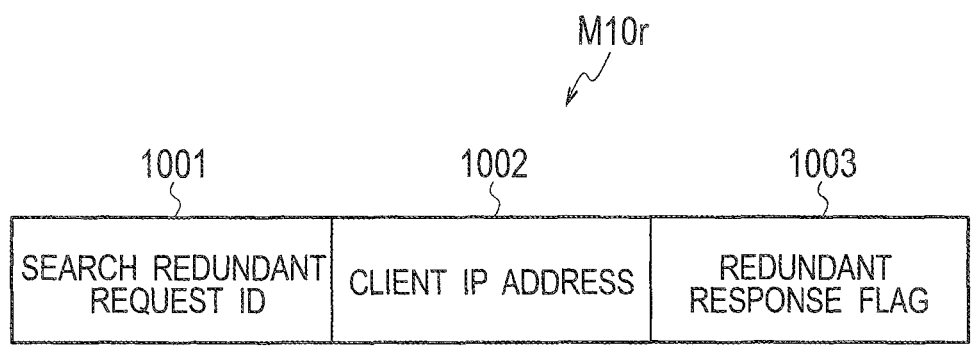
FIG. 13 is a diagram illustrating a configuration example of a probe request message that the wireless terminal sends when searching for the base stations.

In the step S304, the base station search unit 103 sends the probe request message M10*r* as shown in FIG. 12 with a frequency used by the base station 20*c*. FIG. 13 is a configuration example of the probe request message M10*r*. As shown in FIG. 13, the probe request message M10*r* includes a search redundant request ID 1001, a client IP address 1002, and a redundant response message M10*r*.

The search redundant request ID 1001 indicates that the probe request message 10*r* is the probe request message including a flag specifying whether the base station 20 sends the probe response message in response to the probe request message M10*r*, not only wirelessly but also through the wired LAN 30. The client IP address 1002 indicates the IP address of the wireless terminal 10*a*. The redundant response flag 1003 indicates whether to request reception of the probe response message not only wirelessly but also by using the wired LAN 30 via the base station 20*a* currently connected to the wireless terminal 10*a*.

The wireless terminal 10*a* is located within the service area 200*c* of the base station 20*c*. The base station search response unit 204 of the base station 20*c* therefore receives the probe request message M10*r* and sends a probe response message M11*r* to the wireless terminal 10*a* according to the process shown in FIG. 14.

Figure 14:
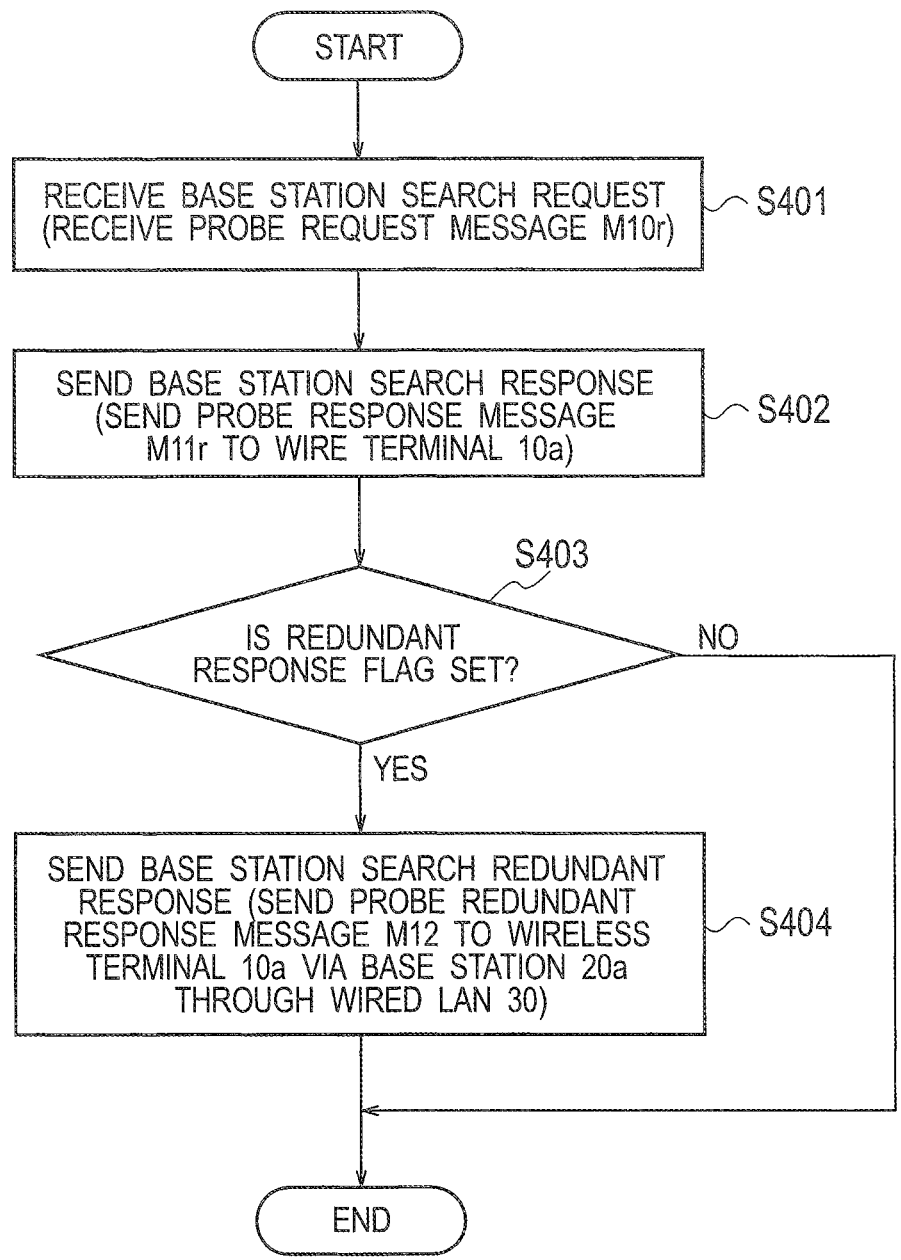
FIG. 14 is a flowchart illustrating a process executed by the base station having received the probe request message.

In step S401 of FIG. 14, the base station search response unit 204 receives the probe request message M10*r* as the base station search request. The base station search response unit 204 sends the probe response message M11*r* as the base station search response to the wireless terminal 10*a*.

When the redundant response flag 1003 is set in the received probe request message M10*r* in step S403 (YES), the base station search response unit 204 sends the probe redundant response message M12 shown in FIG. 12 to the wireless terminal 10*a* as a base station search redundant response via the base station 20*a* using the wired LAN 30.

In this process, even when the base station search response unit 204 does not receive an acknowledgement message for the probe response message M11*r*, the base station search response unit 204 sends the probe redundant response message M12 to the wireless terminal 10*a* without sending the probe response message M11*r* again.

As shown in FIG. 12, the probe redundant response message M12 is composed of a wired transmission message M12*w* transmitted from the base station 20*c* to the base station 20*a* through the wired LAN 30 and a wireless transmission message M12*r* wirelessly transmitted from the base station 20*a* to the wireless terminal 10*a*.

When the redundant response flag 1003 is not set in the received probe request message M10*r* in the step S403 (NO), the base station search response unit 204 terminates the process.

Figure 15:
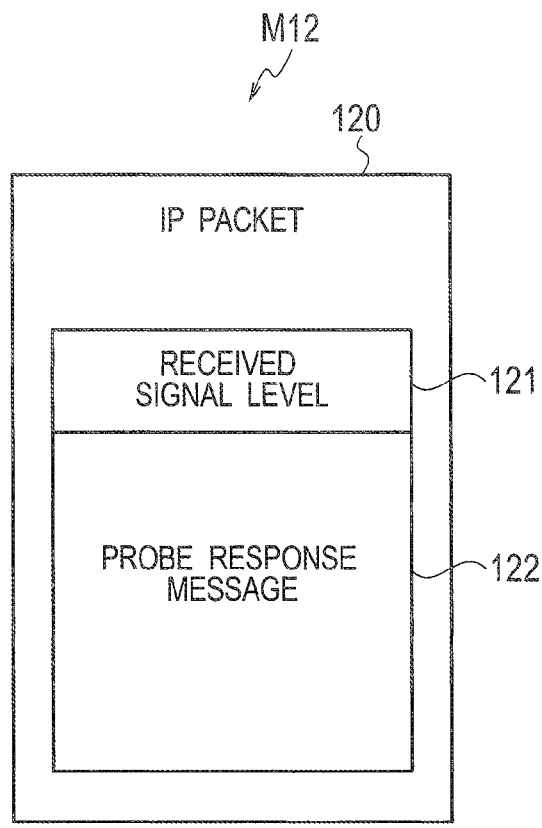
FIG. 15 is a diagram illustrating a configuration example of a probe redundant response message that the base station having received the probe request message sends to the wireless terminal having sent the same.

FIG. 15 is a configuration example of the probe redundant response message M12. As illustrated in FIG. 15, the probe redundant response message M12 is composed of an IP packet 120 including a received signal level 121 and a probe response message 122 which are capsulated. The received signal level 121 indicates the signal level of the probe request message M10*r* received by the base station 20*c*. The contents of the probe response message 122 are the same as those of the probe response message M11*r*.

Returning to FIG. 11, in step S305, the base station search unit 103 determines whether the probe response message M11*r* or probe redundant response message M12 (wireless transmission message Mr12) is received. When any one of the messages M11*r* and M12 is received (YES), in step S306, the base station search unit 103 generates base station information Ibs10 illustrated in FIG. 16 based on the received probe response message M11*r* or probe redundant response message M12. The base station search unit 103 then stores the generated base station information Ibs10 in the base station DB. When neither of the messages M11*r* nor M12 is received (NO), the base station search unit 103 terminates the process.

Figure 16:
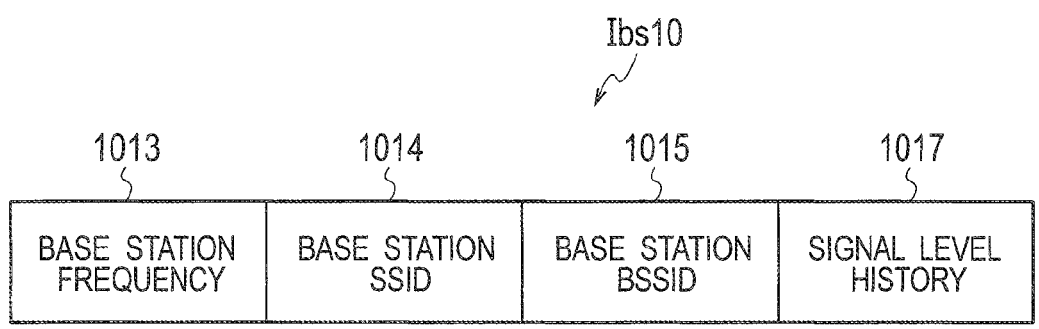
FIG. 16 is a diagram illustrating a configuration example of base station information which is generated by the wireless terminal and is stored in a base station database.

As shown in FIG. 16, the base station information Ibs10 includes a base station frequency 1013, a base station SSID 1014, a base station BSSID 1015, and a signal level history 1017.

The base station frequency 1013, base station SSID 1014 and base station BSSID 1015 are the same as the base station frequency 153, base station SSID 154 and base station BSSID 155 of the base station information Ibs05 illustrated in FIG. 9B, which is acquired from the alternative base station information response message M06r of FIG. 4, respectively. The signal level history 1017 includes the received signal level of the probe response message M11r or the values acquired from the received signal level 121 included in the probe redundant response message M12. The signal level history 1017 may include one or a plurality of received signal levels.

Even when the wireless terminal 10a does not receive the probe response message M11r wirelessly transmitted, the wireless terminal 10a can acquire the base station information on the base station 20c by receiving the probe redundant response message M12 transmitted through the wired LAN 30. The wireless terminal 10a can therefore change the communication frequency back to the former frequency used in communication with the base station 20a without waiting for the probe response message M11r. This can shorten the time for the wireless terminal 10a to operate at the frequency of the base station 20c.

When receiving the probe redundant response message M12 first and then receiving the probe response message M11r, the wireless terminal 10a may overwrite the probe redundant response message M12 with the probe response message M11r.

Step S307 subsequent to the step S306 is described later. On the other hand, in FIG. 11, when the base station search method is not set to active scanning in the step S303 (NO), the base station search unit 103 executes the process by the steps S308, S309, S306, and S307.

The process by the steps S308 and 309 is an operation to search for base stations 20 other than the base station 20a through passive scanning when the wireless terminal 10a is connected to the base station 20a. The base station search unit 103 uses the acquired base station information to execute the process to search for base stations 20 other than the base station 20a in the following manner.

Figure 17:
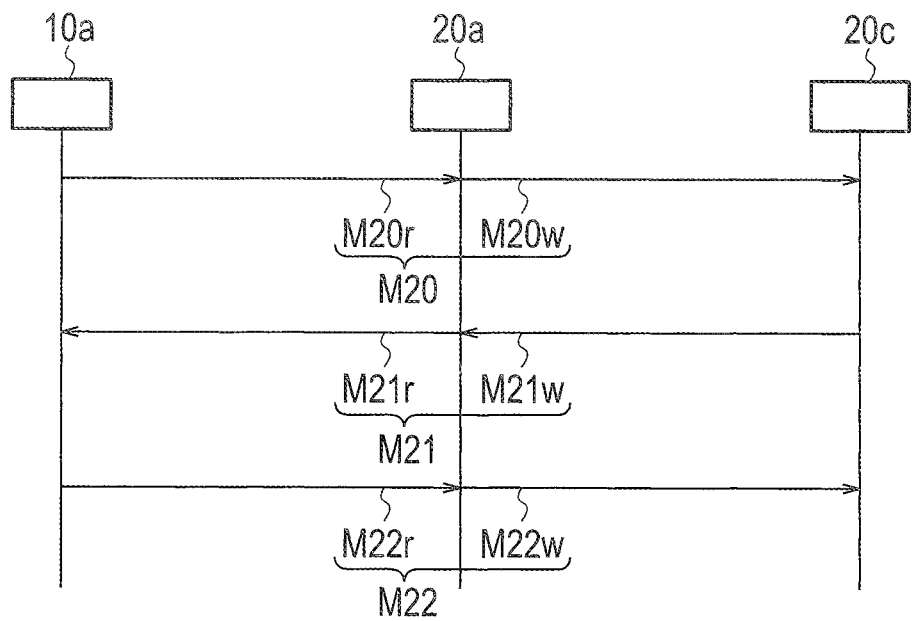
FIG. 17 is a sequence diagram illustrating a message flow to search for base stations when the base station search method is set to passive scanning.

The beacon synchronization processing unit 105 of the wireless terminal 10a executes a beacon synchronous reception process in step S308. As shown in FIG. 17, the beacon synchronization processing unit 105 sends a beacon transmission time request message M20 to the base station 20c via the base station 20a.

The beacon transmission time request message M20 is composed of a wireless transmission message M20r wirelessly transmitted from the wireless terminal 10a to the base station 20a and a wired transmission message M20w transmitted from the base station 20a to the base station 20c through the wired LAN 30.

Figure 18:
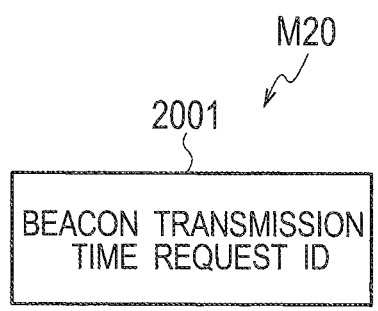
FIG. 18 is a diagram illustrating a configuration example of a beacon transmission time request message that the wireless terminal sends to another base station.

As shown in FIG. 18, the beacon transmission time request message M20 includes a beacon transmission time request ID 2001.

To be specific, in the step S308, the beacon synchronization processing unit 105 executes the process shown in FIG. 19. In FIG. 19, the beacon synchronization processing unit 105 sends the beacon transmission time request message M20 in the step S501. When the base station 20c receives the beacon transmission time request message M20, the beacon synchronization processing unit 206 sends the beacon transmission response message M21 to the wireless terminal 10a as shown in FIG. 17.

The beacon transmission response message M21 is composed of a wired transmission message M21w transmitted from the base station 20c to the base station 20a through the wired LAN 30 and a wireless transmission message M21r wirelessly transmitted from the base station 20a to the wireless terminal 10a.

In step S502, the beacon synchronization processing unit 105 receives the beacon transmission response message M21 sent by the base station 20c.

FIG. 20 is a configuration example of the beacon transmission response message M21. As shown in FIG. 20, the beacon transmission response message M21 includes a beacon transmission timing response ID 2101, a beacon transmission time candidate (1) 2102, and a beacon transmission time candidate (2) 2103.

The beacon transmission timing response ID 2101 indicates that the message M21 is the response message including a beacon transmission time candidate. The beacon transmission time candidates (1) and (2) indicate candidates of the time at which the base station 20c sends a beacon. Herein, the beacon transmission response message M21 includes two beacon transmission time candidates but may include only one candidate, or three or more.

The base station 20c sends beacons by using the Point Coordination Function (hereinafter, PCF) or the Hybrid Coordination Function Controlled Channel Access (hereinafter, HCCA) as an access control method. The beacon transmission time candidates are transmission times at which beacons are sent during a Contention Free Period (hereinafter, CFP). The beacons to be selected as the candidates are those other than the beacons starting the CFP.

When receiving the beacon transmission response message M21 in the step S502, in step S503, the beacon synchronization processing unit 105 selects a transmission time of the beacon that the wireless terminal 10a tries to receive with the frequency used by the base station 20c.

In the step S504, the beacon synchronization processing unit 105 sends a selected beacon transmission time notification message M22 to the base station 20c as shown in FIG. 17. The selected beacon transmission time notification message M22 is composed of a wireless transmission message M22r wirelessly transmitted from the wire terminal 10a to the base station 20a and a wired transmission message M22w transmitted from the base station 20a to the base station 20c via the wired LAN 30.

Figure 21:
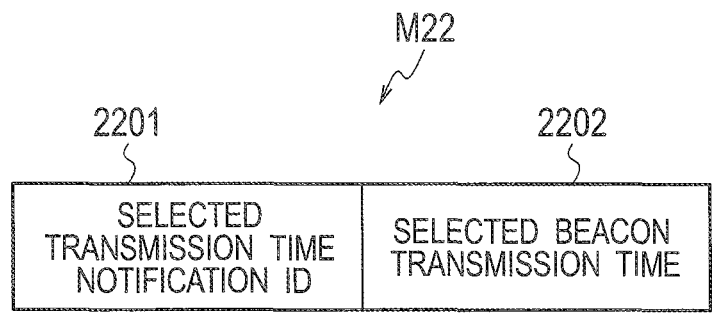
FIG. 21 is a diagram illustrating a configuration example of a selected beacon transmission time notification message that the wireless terminal sends to another base station.

FIG. 21 is a configuration example of the selected beacon transmission time notification message M22. As shown in FIG. 21, the selected beacon transmission time notification message M22 includes a selected transmission time notification ID 2201 and a selected beacon transmission time 2202.

The base station 20c sends a message to permit data transmission to a wireless terminal 10 (not shown in FIG. 1) connected to the base station 20c. When the access control method is PCF, the message to permit data transmission is called CF-Poll. When the access control method is HCCA, the message to permit data transmission is called QoS CF-Poll.

The base station 20c determines whether the communication with the wireless terminal 10 connected to the base station 20c terminates within the beacon transmission time specified by the selected beacon transmission time 2202 included in the selected beacon transmission time notification message M22. When determining that the communication does not terminate, the base station 20c prioritizes transmission of beacons and does not transmit the message to permit transmission.

It may be determined whether the communication with the wireless terminal 10 terminates may be determined based on whether the time to transmission of the beacon is shorter than the time necessary to transmit one MAC Protocol Data Unit (hereinafter, MPDU). When the time to transmission of the beacon is shorter than the time necessary to send one MPDU, it is determined that communication with the wireless terminal 10 does not terminate within the beacon transmission time allotted.

Figure 22:
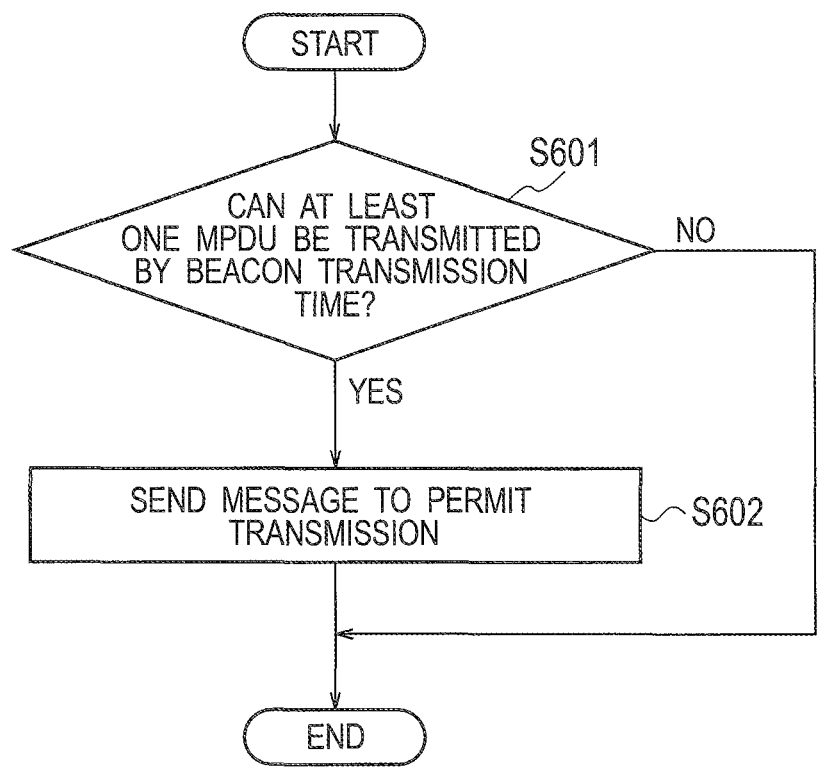
FIG. 22 is a flowchart illustrating a process in which another base station determines whether to send the wireless terminal a message to permit transmission.

As shown in FIG. 22, in step S601, the base station 20c determines whether one or more MPDUs can be sent by the beacon transmission time. When one or more MPDUs can be sent by the beacon transmission time (YES), the base station 20c transmits the message to permit transmission (CF-Poll or QoS CF-Poll) to the wireless terminal 10. When one or more MPDUs cannot be sent (NO), the base station 20c terminates the process.

In the aforementioned manner, the base station 20c sends a beacon to the wireless terminals 10 connected to the base station 20c at the beacon transmission time specified by the selected beacon transmission time 2202 included in the received selected beacon transmission time notification message M22.

After sending the selected beacon transmission time notification message M22, the wireless terminal 10a changes the communication frequency in time with the beacon transmission time selected by the beacon synchronization processing unit 105 and waits for a beacon to be received.

Returning to FIG. 11, in step S309, the beacon synchronization processing unit 105 determines whether the wireless terminal 10 has received a beacon. When the beacon reception processing unit 104 receives a beacon in step S308, it is determined in the step S309 that the wireless terminal 10a has received a beacon (YES). When the beacon reception processing unit 104 does not receive a beacon because of time out in the step S308, it is determined that the wireless terminal 10a has not received a beacon (NO).

When it is determined that the wireless terminal 10a has received a beacon in the step S309 (YES), the wireless terminal 10a moves the process to the step S306. Based on the base station information Ibs05 acquired in the process by the steps S301, S302, and S310, the base station search unit 103 acquires base station information Ibs10 illustrated in FIG. 16 and stores the same in the base station DB. Herein, the signal level history 1017 includes the signal level of the received beacon.

When it is determined in the step S309 that the wireless terminal 10a has not received a beacon (NO), the wireless terminal 10a terminates the process.

The wireless terminal 10a previously understands the time at which the base station 20c sends a beacon and can therefore receive the beacon sent by the base station 20c within the minimum waiting time.

When the base station search unit 103 acquires the base station information by active or passive scanning and stores the base station information in the step S306 of FIG. 11 in the aforementioned manner, the base station information management unit 106 executes the process of the step S307.

Figure 23:
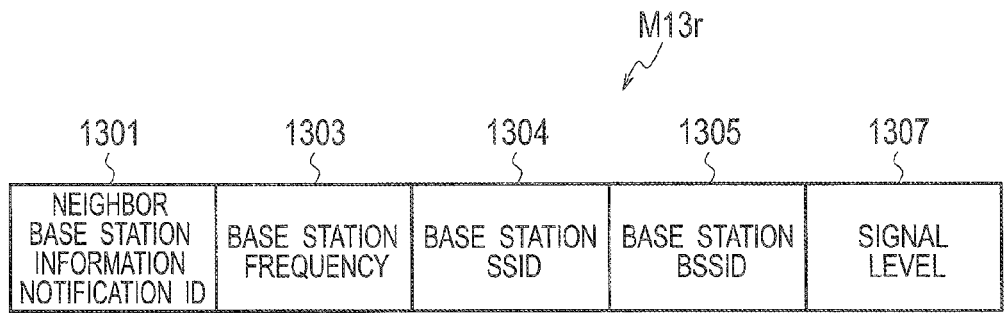
FIG. 23 is a diagram illustrating a configuration example of a neighbor base station information notification message that the wireless terminal sends to the base station.

The base station information management unit 106 sends a neighbor base station information notification message M13r shown in FIG. 23 to the base station 20a in the step S307. The neighbor base station information notification message M13r includes a neighbor base station information notification ID 1301, a base station frequency 1303, a base station SSID 1304, a base station BSSID 1305, and a signal level 1307.

The base station frequency 1303, base station SSID 1304, and base station BSSID 1305 are information acquired when the wireless terminal 10a receives the probe redundant response message M12 (or probe response message M11r) or a beacon from the base station 20c. The signal level 1307 is the same as the received signal level 121 included in the probe redundant response message M12 when the wireless terminal 10a receives the probe redundant response message M12 from the base station 20c. Alternatively, the signal level 1307 is the signal level of the probe response message M11r or the beacon when the wireless terminal 10a receives the probe response message M11r or the beacon.

Figure 24:
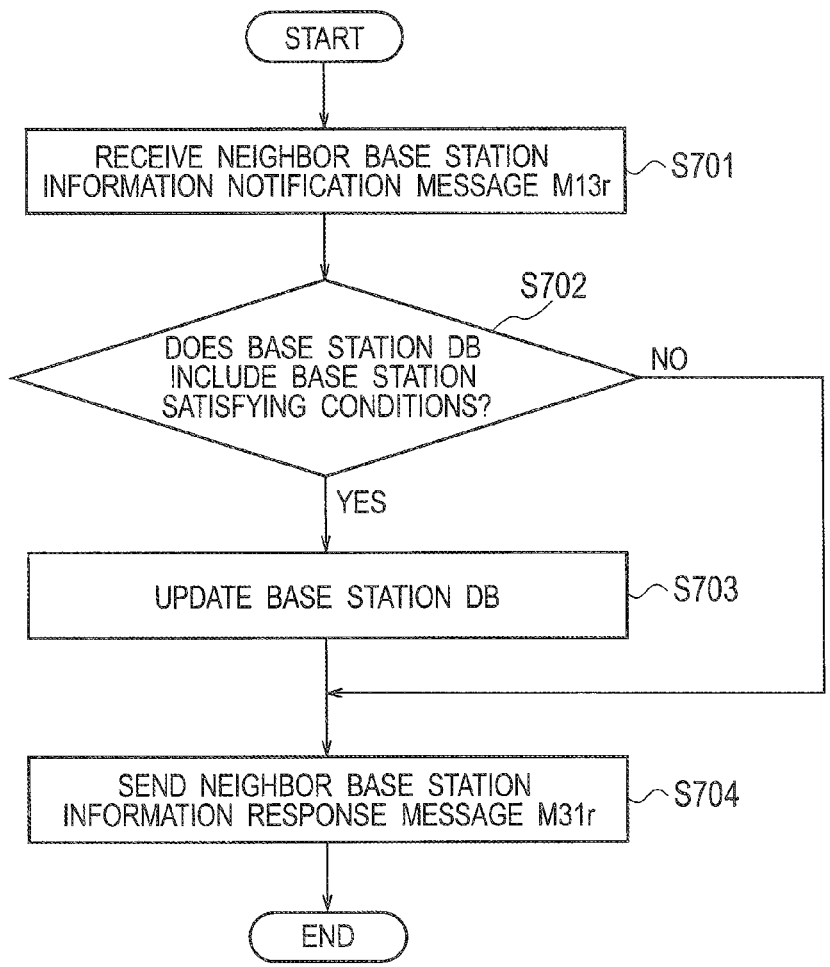
FIG. 24 is a flowchart illustrating a process in which the base station receives the neighbor base station information notification message.

FIG. 24 shows a process executed when the base station 20a receives the neighbor base station information notification message M13r. In step S701 of FIG. 24, the base station information management unit 203 receives the neighbor base station information notification message M13r. In step S702, the base station information management unit 203 determines whether the base station DB includes a base station 20 that satisfies the conditions.

Herein, the base station 20 satisfies the conditions means that the base station frequency, base station SSID, and the base station BSSID of the base station 20 are the same as the base station frequency 1303, base station SSID 1304, and base station BSSID 1305, respectively.

When there is a base station 20 that satisfies the conditions in the base station DB (YES), the base station information management unit 203 updates the base station DB in the step S703. In this process, a signal level 1307 is added to the neighbor base station candidates 146 and 156 of the base station information Ibs04 and Ibs05 in FIGS. 9A and 9B. The information added to the neighbor base station candidates 146 and 156 is not limited to the signal level 1307 and may include the time when the neighbor base station information notification message M13r is received.

The base station information management unit 203 moves the process to step S704 after the step S703. When the base station DB does not include any information on the base station 20 that satisfies the conditions in the step S702 (NO), the base station information management unit 203 moves the process to step S704.

In the step S704, the base station information processing unit 202 sends the neighbor base station information response message M31r to the wireless terminal 10a and terminates the process.

Figure 25:
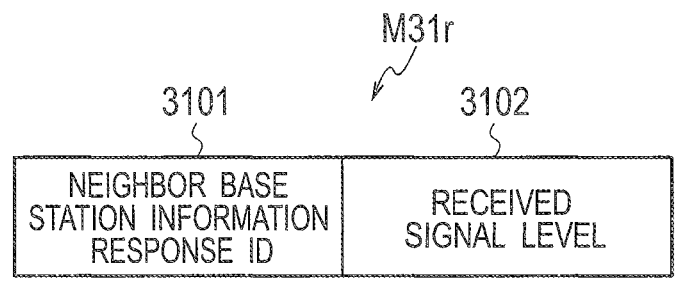
FIG. 25 is a diagram illustrating a configuration example of a neighbor base station information response message that the base station sends to the wireless terminal.

FIG. 25 is a configuration example of the neighbor base station information response message M31r. The neighbor base station information response message M31r includes a neighbor base station information response ID 3101 and a received signal level 3102. The neighbor base station information response ID 3101 indicates that the message M31r is the neighbor base station information response message. The received signal level 3102 indicates the received signal level of the neighbor base station information response message M31r.

The neighbor base station around the base station 20a acquired by the wireless terminal 10a is thus registered in the base station 20a. This allows another wireless terminal 10 that is connected to the base station 20a or newly connected to search for base stations 20 by using the information on the base station DB. Accordingly, the wireless terminal 10 can find the base station 20 with higher certainty.

Meanwhile, in the step S305 in the aforementioned case of active scanning, if the received signal level 121 included in the probe redundant response message M12 shown in FIG. 15 is used as the signal level of data received by the wireless terminal 10a to create the base station information Ibs10, the value of the received signal level stored in the base station DB can be different from the signal level of data actually received from the base station 20c.

It is therefore preferable that the wireless terminal 10a corrects the value indicated by the received signal level 121 to determine the corrected received signal level as the signal level of data received from the base station 20c.

The signal level (Lx) of data received by the wireless terminal 10a from the base station 20c can be estimated by (L1×L3)/L2. Herein, L1 is the value indicated by the received signal level 121; L2 is the signal level of data received by the base station 20a from the wireless terminal 10; and L3 is the signal level of data received by the wireless terminal 10a from the base station 20a.

The signal level L2 of data from the wireless terminal 10a received by the base station 20a can be the same as the received signal level 3102 included in the neighbor base station information response message M31r of FIG. 25.

Figure 26:
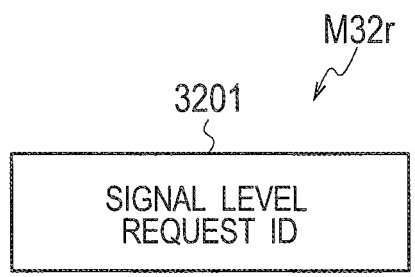
FIG. 26 is a diagram illustrating a configuration example of a signal level request message that the wireless terminal sends to the base station.
Figure 27:
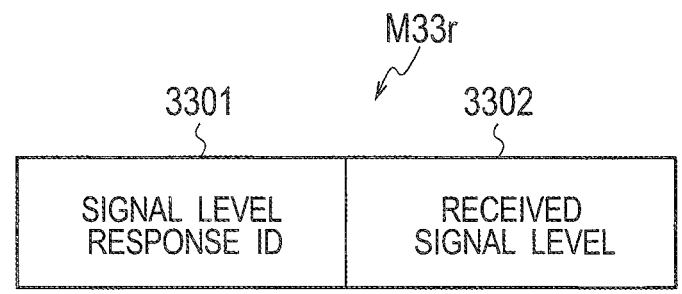
FIG. 27 is a diagram illustrating a configuration example of a signal level response message that the base station sends to the wireless terminal.

The signal level L3 of data from the base station 20a received by the wireless terminal 10a can be obtained in such a manner that the wireless terminal 10a sends a signal level request message M32r shown in FIG. 26 to the base station 20a and the base station 20a sends a signal level response message M33r shown in FIG. 27 to the wireless terminal 10a.

The signal level request message M32r includes a signal level request ID 3201. The signal level response message M33r includes a signal level response ID 3301 and a received signal level 3302. The signal level response ID 3301 indicates that the message M33r is the signal level response message. The received signal level 3302 indicates the received signal level of the signal level response message M33r received by the base station 20a from the wireless terminal 10a.

As apparent from the above description, the wireless LAN system of the embodiments includes a wireless terminal 10 and a plurality of base stations 20 connected to one another through the wired LAN 30. When focusing the wireless terminal 10a in FIG. 1, for example, the plurality of base stations 20 include the base station 20a wirelessly connected to the wireless terminal 10a using a first frequency and the base station 20c which is not wirelessly connected to the wireless terminal 10a.

Herein, the base station 20a, which is wirelessly connected to the wireless terminal 10a, is referred to as a connected base station, and the base station 20c, which is not wirelessly connected to the wireless terminal 10a, is referred to as a non-connected base station.

When the wireless terminal 10a is configured to perform active scanning, the wireless terminal 10a, connected base station 20a, and non-connected base station 20c individually have configurations as follows.

The wireless terminal 10a includes a probe request message transmission section for changing the communication frequency from the first frequency to the second frequency used by the non-connected base station 20c to send the probe request message M10r to the non-connected base station 20c.

The non-connected base station 20c includes a first probe response message transmission section which sends the probe response message M11r (a first probe response message) to the wireless terminal 10a in response to reception of the probe request message M10r. The non-connected base station 20c includes a second probe response message transmission section which sends the probe redundant response message M12 (a second probe response message) to the connected base station 20a through the wired LAN 30 in response to reception of the probe request message M10r.

The connected base station 20a includes a third probe response message transmission section which wirelessly sends the probe redundant response message M12 to the wireless terminal 10a using the first frequency. The second probe response message is transmitted as the IP packet 120, and the connected base station 20a needs to send just the IP packet 120 to the wireless terminal 10a as normal communication data. The third probe response message transmission section needs to send just the IP packet to the wireless terminal 10a as normal communication data.

The wireless terminal 10a includes a probe response message reception section which changes the second frequency to the first frequency to receive the probe redundant response message M12 sent by the third probe response message transmission section.

The wireless terminal 10a as the wireless communication device includes a probe request message transmission section which, when the wireless terminal 10a is wirelessly connected to the connected base station 20a using the first frequency, changes the communication frequency to the second frequency used by the non-connected base station 20c, that is not wirelessly connected to the wireless terminal 10a but is connected to the base station 20a through the wired LAN 30, to send the probe request message M10r to the non-connected base station 20c.

The wireless terminal 10a includes a probe response message reception section which wirelessly receives from the connected base station 20a using the first frequency, the probe redundant response message M12 (a second probe response message) that the non-connected base station 20c, that wirelessly sends the probe response message M11r (the first probe response message) using the second frequency in response to reception of the probe request message M10r, sends to the connected base station 20a through the wired LAN 30 in response to the reception of the probe request message M10r.

The probe response message reception section changes the communication frequency from the second frequency to the first frequency after the probe request message is sent by the probe request transmission means and thereby receives the second probe response message from the connected base station 20a.

According to the wireless LAN system and wireless communication device of the embodiments having the aforementioned configuration, the time to search for base stations (the non-connected base station 20c) different from the connected base station (the connected base station 20a) can be shortened.

The second probe response message transmission section preferably sends a message including the received signal level of the probe request message M10r received by the non-connected base station 20c, as the probe redundant response message M12.

The wireless terminal 10a preferably includes a signal level determination section that determines the signal level at which the wireless terminal 10a and non-connected base station 20c wirelessly communicate with each other, based on the received signal level included in the probe redundant response message M12.

The signal level determination section preferably includes an estimation section. The estimation section corrects the received signal level included in the probe redundant response message M12 using the signal level of data received by the connected base station 20a from the wireless terminal 10a and the signal level of data received by the wireless terminal 10a from the connected base station 20a to estimate the signal level of data received by the wireless terminal 10a from the non-connected base station 20c. The signal level determination section determines the signal level at which the wireless terminal 10a and non-connected base station 20c wirelessly communicate with each other, based on the signal level estimated by the estimation section.

According to the wireless LAN system and wireless communication device of the embodiments having the aforementioned configuration, even when the wireless terminal 10a cannot wirelessly receive messages from the non-connected base station 20c, the wireless terminal 10a can determine the signal level at which the wireless terminal 10a wirelessly communicate with the non-connected base station 20c.

The wireless terminal 10a includes the estimation section to estimate the signal level of data received by the wireless terminal 10a from the non-connected base station 20c and therefore can properly determine the signal level at which the wireless terminal 10a wirelessly communicates with the non-connected base station 20c.

On the other hand, when the wireless terminal 10a is configured to perform passive scanning, the wireless terminal 10a, connected base station 20a and non-connected base station 20c individually have the configurations shown below.

The wireless terminal 10a includes a beacon transmission time request message transmission section which sends the beacon transmission time request message M20 to the non-connected base station 20c via the connected base station 20a.

The non-connected base station 20c includes a beacon transmission response message transmission section which, in response to reception of the beacon transmission time request message M20, sends the beacon transmission response message M21 to the wireless terminal 10a via the connected base station 20a. Herein, the beacon transmission response message includes one or a plurality of beacon transmission time candidates.

The wireless terminal 10a includes a selected beacon transmission time notification message transmission section which, in response to reception of the beacon transmission response message M21, sends the selected beacon transmission time notification message M22, that includes the candidate selected from the beacon transmission time candidates as the selected beacon transmission time 2202, to the non-connected base station 20c via the connected base station 20a.

The non-connected base station 20c includes a determination section which determines whether communication with the wireless terminal 10a terminates within the beacon transmission time specified by the selected beacon transmission time 2202.

The non-connected base station 20c includes a selective transmission section. When the determination section determines that the communication with the wireless terminal 10a terminates within the beacon transmission time, the selective transmission section sends a message to permit data transmission to a wireless terminal 10 connected to the non-connected base station 20c. When the determination section determines that the communication with the wireless terminal 10a does not terminate within the beacon transmission time, the selective transmission section preferentially sends a beacon and does not transmit a message to permit data transmission to a wireless terminal 10 connected to the non-connected base station 20c.

According to the wireless LAN system and wireless communication device of the embodiments having the aforementioned configuration, the search time necessary to search for base stations (the non-connected base station 20c) different from the base station (the connected base station 20a) can be shortened. According to the wireless LAN system and wireless communication device of the embodiments having the aforementioned configuration, the communication frequency is changed when a beacon is outputted, thus increasing the certainty compared with the situation of the beacon transmission timing not synchronizing with the search timing.

The non-connected base station 20c includes a selective transmission section so that a beacon is sent when the wireless terminal 10a is waiting for the beacon.

The scanning operation by active scanning and passive scanning described above may be configured as the scanning operation of a special scan mode. The wireless terminal 10 switches between the scan operation normally performed and the scan operation in the special scan mode.

If it is previously known that the base station 20 in the area where the wireless terminal 10 is in use does not support the special scan mode, for example, the scan mode of the wireless terminal 10 is set to a mode in which only the normally performed scan operation is carried out. This can prevent unnecessary communication.

Each section provided for the wireless terminal 10 and base station 20 described above may be implemented by hardware or by software (computer programs). Alternatively, each section may be implemented by a mixture of hardware and software. It may be freely determined which portions of the wireless terminal 10 and base section 20 are composed of hardware or software.

What is claimed is:
1. A wireless LAN system comprising:
a wireless terminal; and
a plurality of base stations connected to each other through a wired LAN, the plurality of base stations including a first base station configured to wirelessly connect to the wireless terminal using a first frequency, and a second base station configured to wirelessly connect to the wireless terminal using a second frequency,
wherein the wireless terminal is wirelessly connected to the first base station using the first frequency, and the wireless terminal is not wirelessly connected to the second base station using the second frequency,
wherein the wireless terminal includes a probe request message transmission section configured to change communication frequency from the first frequency to the second frequency to wirelessly send a probe request message to the second base station without going through the first base station,
wherein the second base station includes:
a first probe response message transmission section configured to wirelessly send a first probe response message to the wireless terminal using the second frequency in response to reception of the probe request message without going through the first base station; and
a second probe response message transmission section configured to redundantly send a second probe response message to the first base station through the wired LAN in response to reception of the probe request message, wherein the first base station includes a third probe response message transmission section configured to wirelessly send the second probe response message to the wireless terminal using the first frequency, and wherein the wireless terminal further includes a probe response message reception section configured to change the communication frequency from the second frequency to the first frequency after the wireless terminal wirelessly sent the probe request message to the second base station, and to receive the second probe response message sent by the third probe response message transmission section.

2. The wireless LAN system according to claim 1, wherein the second probe response message transmission section sends as the second probe response message, a message including a received signal level of the probe request message received by the second base station, and the wireless terminal further includes a signal level determination section configured to determine the signal level at which the wireless terminal and the second base station wirelessly communicate with each other, based on the received signal level included in the second probe response message.

3. The wireless LAN system according to claim 2, wherein the signal level determination section includes an estimation section configured to correct the received signal level included in the second probe response message using the signal level of data received by the first base station from the wireless terminal and the signal level of data received by the wireless terminal from the first base station and thereby estimate the signal level of data received by the wireless terminal from the second base station, and the signal level determination section determines the signal level at which the wireless terminal and the second base station wirelessly communicate with each other, based on the signal level estimated by the estimation section.

4. The wireless LAN system according to claim 1, wherein the probe request message transmission section sends a probe request message including a redundant response flag indicating whether to request reception of the second probe response message, and the second probe response message transmission section redundantly sends the second probe response message to the first base station through the wired LAN, when the redundant response flag indicates to request reception of the second probe response message.

* * * * *